(12) United States Patent
Nakamura et al.

(10) Patent No.: US 7,383,039 B2
(45) Date of Patent: Jun. 3, 2008

(54) RADIO COMMUNICATION SYSTEM HAVING ID MANAGEMENT APPARATUS, OPERATION MANAGEMENT APPARATUS AND LINE CONTROLLER

(75) Inventors: Tadashi Nakamura, Kodaira (JP); Hidetoshi Nishiyama, Kodaira (JP); Koichi Kawahata, Akishima (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 329 days.

(21) Appl. No.: 11/215,007

(22) Filed: Aug. 31, 2005

(65) Prior Publication Data

US 2006/0046705 A1    Mar. 2, 2006

(30) Foreign Application Priority Data

Sep. 1, 2004   (JP)   ............................. 2004-253779

(51) Int. Cl.
   *H04M 3/00*   (2006.01)
(52) U.S. Cl. .................. 455/419; 455/418; 455/420; 455/422.1; 455/450; 379/46; 379/49
(58) Field of Classification Search ............... 455/419, 455/418, 420, 422.1, 450, 453, 452.2; 379/46, 379/49
   See application file for complete search history.

(56) References Cited

U.S. PATENT DOCUMENTS 5,157,709 A * 10/1992 Ohteru ....................... 455/465
6,542,747 B1 * 4/2003 Syukri ........................ 455/450
7,072,654 B2 * 7/2006 Fujiwara et al. ............ 455/435.1
2002/0152314 A1 * 10/2002 Hayek et al. ................ 709/227

FOREIGN PATENT DOCUMENTS

| JP | 8-65229 | | 3/1996 |
| JP | 2003-249891 | * | 2/2002 |
| JP | 2003-249891 | | 9/2003 |

OTHER PUBLICATIONS

ARIB STD-T87, 1.0 "Airport Digital Mobile Telecommunication System", pp. 1-15.

* cited by examiner

*Primary Examiner*—Rafael Perez-Gutierrez
*Assistant Examiner*—Khai Nguyen
(74) *Attorney, Agent, or Firm*—Mattingly, Stanger, Malur & Brundidge, P.C.

(57) ABSTRACT

A radio communication system includes ID control equipment, a operation control unit, line controller, pieces of base station, and radio terminals. In the radio communication system, environment information about identification information (IDs) etc. set for the radio terminals is managed effectively. In the ID control equipment, an ID information setting means sets information about IDs for the radio terminals. In the ID control equipment, the operation control unit or the line controller, an ID information storage unit (e.g. memory 4) stores the information about IDs set for the radio terminals by the ID control equipment.

1 Claim, 7 Drawing Sheets

FIG.9

| AIRLINE COMPANY A | | AIRLINE COMPANY B | | AIRLINE COMPANY C | |
|---|---|---|---|---|---|
| PILOTS | 00-111-2345<br>00-111-4567<br>00-111-XXXX | PILOTS | 01-111-XXXX .... | PILOTS | 02-111-XXXX .... |
| FLIGHT ATTENDANTS | 00-112-XXXX .... | FLIGHT ATTENDANTS | 01-112-XXXX .... | FLIGHT ATTENDANTS | 02-112-XXXX .... |
| GROUND CREWS | 00-113-XXXX .... | GROUND CREWS | 01-113-XXXX .... | GROUND CREWS | 02-113-XXXX .... |

RADIO COMMUNICATION SYSTEM HAVING ID MANAGEMENT APPARATUS, OPERATION MANAGEMENT APPARATUS AND LINE CONTROLLER

INCORPORATION BY REFERENCE

The present application claims priority from Japanese application JP2004-253779 filed on Sep. 1, 2004, the content of which is hereby incorporated by reference into this application.

FIELD OF THE INVENTION

The present invention relates to a radio communication system in which identification information (IDs) is set for each radio terminal by ID control equipment, and particularly relates to a radio communication system for effectively managing environment information such as identification information (IDs) set for each radio terminal.

BACKGROUND OF THE INVENTION

In a radio communication system such as an airport digital mobile telecommunication system, base station, line controller, etc. are installed in an airport so as to make wireless communication between the base station and each terminal. As a communication system to be used, there is an FDMA system in which a system bandwidth is frequency-divided into communication channels, or a TDM/TDMA system in which each radio carrier is defined as a frame, and the frame is divided into four slots so as to form multi-channels.

FIG. 7 shows a concept of an airport digital mobile telecommunication system in the background art. A radio communication system in the background-art is arranged, for example, by base unit of one airport, and constituted by control station equipment, base station and mobile station equipment so as to make communication between a premises terminal and a mobile station or between a mobile station and another mobile station. The background-art radio communication system in FIG. 7 shows a minimum system configuration by way of example, in which functions such as direct communication between mobile stations are added to a one-base-station zone system in which an operating area of mobile stations is covered by one base station.

FIG. 8 shows an example of the configuration of the base station zone system in the background art. An entrance line between the control station equipment and each base station may be constructed of a wire line. Each channel to be used for communication is comprised of a control channel and a communication channel.

Non-Patent Document 1:

ARIB STD-T87, "Airport Digital Mobile Telecommunication System", written about airport digital mobile telecommunication systems in the background art by The Association of Radio Industries and Businesses (ARIB).

In order to give shape to a radio communication system in the background art, there have been invented an airport radio communication system (airport MCA (Multi-Channel Access) radio system) using an MCA system as shown in FIG. 5 and an airport MCA radio system allowing environment information to flow therein as shown in FIGS. 6(A) and (B).

However, in the radio communication system as described above, it is still insufficient to manage environment information such as identification information (IDs) set for each terminal. Thus, there has been a request for further development.

SUMMARY OF THE INVENTION

The present invention was developed in consideration of the situation of the aforementioned previous inventions. An object of the present invention is to provide a radio communication system which can effectively manage environment information such as identification information (IDs) set for each radio terminal.

Specific examples will be described below.

(1) In the setting (for example, new setting or change) of IDs shown by use of FIG. 5, each radio terminal G1, G2 has to be carried to the place of a center station where a operation control unit 22 etc. are installed. Accordingly, there has been a problem that it is very troublesome and inefficient to set IDs.

An object of the present invention is to provide a radio communication system which can, for example, effectively change identification information (IDs) set for radio terminals.

(2) Assume that environment information about IDs or the like is shared in an MCA radio system when the environment information is collected as shown by use of FIGS. 6(A) and (B). In such a case, after environment information is registered in a radio terminal 33, the terminal has to be moved to the place of a center station where a operation control unit 42 or the like is installed, so as to register the environment information registered in a radio terminal 33. Generally the center station is located at a distant place. Accordingly, there has been a problem that it is very troublesome and inefficient to collect environment information.

In addition, since environment information is shared between ID control equipment 31 and the operation control unit 42, it is, for example, impossible to provide a plurality of pieces of ID control equipment.

Another object of the present invention is to provide a radio communication system which can effectively collect environment information, for example, about radio terminals. Further another object of the present invention is to provide a radio communication system in which, for example, a plurality of pieces of ID control equipment can be provided.

In order to attain the foregoing objects, a radio communication system according to the present invention includes ID control equipment, a operation control unit, line controller, base station, and radio terminals, and performs processes as follows.

That is, in the ID control equipment, an ID information setting means sets information about IDs for the radio terminals.

In at least one of the ID control equipment, the operation control unit and the line controller, an ID information storage means stores the information about IDs set for the radio terminals by the ID control equipment.

Thus, the identification information (IDs) set for the radio terminals can be managed effectively.

Here, various apparatus may be used as the ID control equipment, the operation control unit, the line controller, the base station and the radio terminals respectively.

The ID control equipment, for example, has a function of setting various IDs for the radio terminals.

The operation control unit, for example, has a function of operating and managing the radio communication system automatically or manually. For example, the operation control unit can be arranged using a console or the like, which console is operated by a person (user) so as to perform various controls or processes. The operation control unit may, for example, have a screen to display and output environment information such as information about IDs or information about system control to the person (user).

The line controller is, for example, connected to one or plural pieces of base station and has a function of perform communication control.

The base station has a function of making wireless communication with at least one radio terminal present in a communicatable region of the base station.

Each radio terminal has a function of making wireless communication with the base station.

Various information may be used as the information about IDs. For example, information about IDs (unique IDs) unique to the radio terminals respectively may be used. When the radio terminals make communications in a plurality of systems assigned to the radio terminals, information about IDs (system IDs) for identifying the systems may be used. When the radio terminals make communication in a plurality of groups assigned thereto, information about IDs (group IDs) for identifying the groups may be used.

The means for storing the information may be, for example, constituted by a memory.

The ID information storage means may be, for example, provided independently in each piece of equipment, or may be shared among two or more pieces of equipment.

Examples of setting of information may include new setting (new registration), change (change of registration) of information already set, deletion of information already set, etc.

According to one configuration example, the radio communication system according to the present invention performs processes as follows.

That is, environment information about the radio terminals is stored in the ID information storage means.

In at least one of the ID control equipment, the operation control unit and the line controller, an environment information process executing means executes processes-based on the environment information about the radio terminals stored in the ID information storage means.

Thus, the environment information set for the radio terminals can be managed effectively, and suitable processes can be executed based on the environment information.

Here, various information may be used as the environment information about the radio terminals. Examples of the information may include information about IDs, information about the condition of radio communication performed by each radio terminal, information about the condition of the quality of radio communication performed by each radio terminal, information about the position of each radio terminal, etc.

Various processes may be used as the processes based on the environment information. Examples of the processes may include communication control processes such as an individual communication process, a system-by-system communication process or a group-by-group communication process based on assignment of IDs, a communication channel assignment process based on the condition of communication or the condition of communication quality, etc.

The environment information process executing means may be constituted, for example, by a function provided in one piece of equipment or by functions provided in two or more pieces of equipment.

In one configuration example of the radio communication system according to the present invention, the following processes are performed.

That is, information about group IDs for identifying groups the radio terminals belong to is used as the aforementioned information about IDs.

In the ID control equipment, the ID information setting means can change group organization of the radio terminals by changing information of a group ID which is set for each of the radio terminals and which the radio terminal belongs to.

Thus, when the group IDs set for the radio terminals are changed by the ID control equipment, the group organization can be changed.

For example, group organization in non-emergency (e.g. ordinary time) and group organization in emergency are set to be different from each other. In response to the ID control equipment detecting emergency in non-emergency time, the information of group IDs set for one or plural radio terminals can be changed in accordance with the group organization in emergency. In this case, the contents of the group organization in non-emergency or the contents of the group organization in emergency are, for example, set in a memory of the ID control equipment, the operation control unit or the like in advance. As the manner to detect emergency, various manners may be used. Examples of the manners may include a manner to detect emergency based on a notification of emergency given by the ID control equipment, the operation control unit or the like operated by a person (user), a manner to detect emergency by receiving a signal indicating emergency and transmitted to the ID control equipment, the operation control unit or the like by a radio terminal operated by a person (user), a manner to (automatically) detect emergency when predetermined conditions are satisfied, for example, when data of an acquired image are analyzed and abnormality is detected in the image or when an acquired temperature exceeds a threshold value.

Another radio communication system according to the present invention performs the following processes in a configuration including ID control equipment, a operation control unit, line controller, base station, and radio terminals.

That is, in the ID control equipment, an ID management control information transmitting means transmits control information about setting of information of IDs for the radio terminals, to the operation control unit.

In the operation control unit, a system management control information receiving means receives the control information transmitted from the ID control equipment, and a system management control information transmitting means transmits control information based on the received control information to the line controller.

In the line controller, a network control control information receiving means receives the control information transmitted from the operation control unit, and a network control control information transmitting means transmits control information based on the received control information to the base station.

In the base station, a base station control information receiving means receives the control information transmitted from the line controller, and a base station control information wireless transmitting means transmits control information based on the received control information to the radio terminals by wireless.

In each of the radio terminals, a radio terminal control information wireless receiving means receives the control information transmitted from the base station by wireless, and an ID information memory setting means sets information of IDs in a memory based on the received control information.

In at least one of the ID control equipment, the operation control unit and the line controller, an ID information storage means stores the information about IDs set for the radio terminals.

Thus, identification information (IDs) set for the radio terminals can be managed effectively. For example, the identification information (IDs) set for the radio terminals can be changed effectively.

Here, various information may be used as the control information about setting of information of IDs for the radio terminals. For example, it is possible to use information of a terminal number or the like (for example, information of an ID) for identifying a radio terminal to be set, or information including information of an ID to be set (for example, information of an ID after the change).

Examples of the manner to transmit control information based on the received control information may include a manner to transmit the contents of the received control information as they are, a manner to transmit a part extracted from the received control information, a manner to transmit the received control information with another information added thereto, etc.

Another radio communication system according to the present invention performs the following processes in a configuration including a plurality of pieces of ID control equipment, a operation control unit, line controller, base station, and radio terminals.

That is, a network is provided for connecting the operation control unit with the plurality of pieces of ID control equipment.

In each piece of the ID control equipment, a wire connection means connects with the radio terminals through a wire line, and an information transmitting means transmits information about the radio terminals connected through the wire line, to the operation control unit through the network.

In the operation control unit, an information receiving means receives the information transmitted from the ID control equipment through the network, and an information storage means stores the received information.

Thus, information such as identification information (IDs) set for the radio terminals can be managed effectively. For example, environment information about the radio terminals can be collected effectively. It is also possible to provide a plurality of pieces of ID control equipment for one operation control unit.

Various circuits may be used as the network. For example, a network such as a public circuit or a LAN (Local Area Network) circuit may be used.

Various information may be used as the information (information about the radio terminals) transmitted from the ID control equipment to the operation control unit. Examples of the information may include information about IDs or the like set for the radio terminals, information about the condition of communication detected by each radio terminal, etc.

For example, when information is to be set for a radio terminal, the ID control equipment may use a manner to acquire the information as information to be set for the radio terminal and transmit the acquired information. Alternatively the ID control equipment may use a manner to acquire information set for a radio terminal and input from the radio terminal, and transmit the acquired information, or a manner to acquire information detected by a radio terminal and input from the radio terminal, and transmit the acquired information.

In the operation control unit, for example, information for identifying each radio terminal and other information about the radio terminal are associated with each other, and stored by the information storage means.

As has been described above, according to the radio communication system according to the present invention, the ID control equipment sets information about IDs for the radio terminals, while at least one of the ID control equipment, the operation control unit and the line controller stores the information about IDs set for the radio terminals. Accordingly, the information set for the radio terminals can be managed effectively.

In one configuration example, environment information about the radio terminals is stored, while at least one of the ID control equipment, the operation control unit and the line controller executes processes based on the stored environment information about the radio terminals. Accordingly, suitable processes can be executed based on the environment information.

In another configuration example, the ID control equipment changes information of a group ID which is set for a radio terminal and which the radio terminal belongs to. Accordingly, the group organization can be changed.

According to the radio communication system according to the present invention, the ID control equipment transmits control information about setting of information of an ID for each radio terminal, to the operation control unit. Information based on the control information is transmitted to the radio terminal through the operation control unit, the line controller and the base station by wireless. The radio terminal sets information of the ID in a memory based on the received information. At least one of the ID control equipment, the operation control unit and the line controller stores the information of IDs set for the radio terminals. Accordingly, information set for the radio terminals can be managed effectively. For example, information set for the radio terminals can be changed effectively.

According to the radio communication system according to the present invention, a network is provided for connecting the operation control unit with a plurality of pieces of ID control equipment. Each piece of ID control equipment is connected to each radio terminal through a wire line, so as to acquire information about the radio terminal and transmit the acquired information to the operation control unit through the network. The operation control unit receives the information from each piece of ID control equipment through the network, and stores the received information. Accordingly, information set for the radio terminals can be managed effectively. For example, information about the radio terminals can be collected effectively. In addition, a plurality of pieces of ID control equipment can be provided for one operation control unit.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram for explaining a memory table in a memory according to the present invention.

DESCRIPTION OF THE EMBODIMENTS

For example, in a radio communication system such as an airport digital mobile telecommunication system, base station, line controller, etc. are installed in an airport, and communication is performed between the base station and each terminal by wireless.

(1) A First Example Will be Described.

Figure 5:
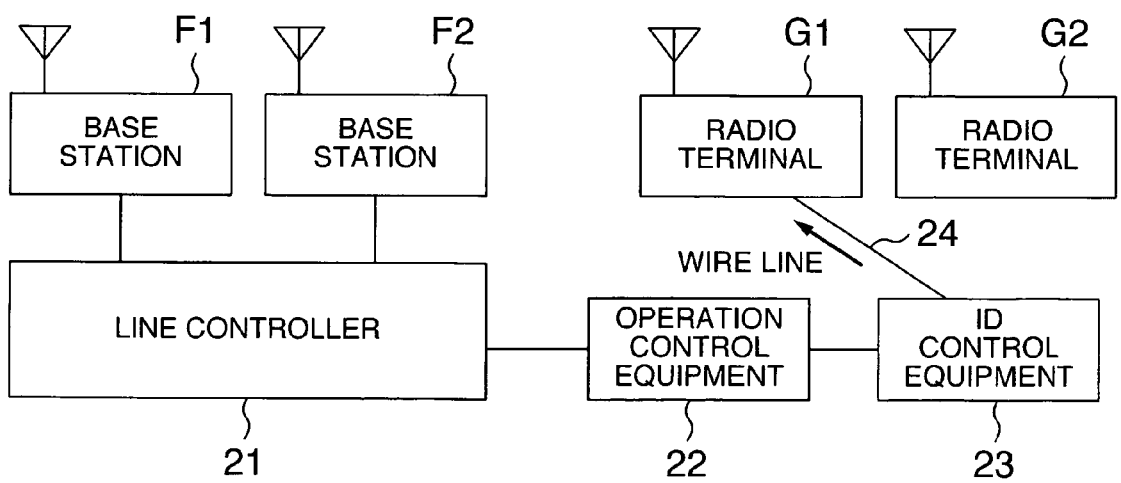
FIG. 5 is a diagram showing an example of setting of IDs.

FIG. 5 shows an example of a configuration of an airport radio communication system (airport MCA (Multi-Channel Access) radio system) using an MCA system.

Specifically, FIG. 5 shows the system management side provided with base station F1, F2, line controller 21, a operation control unit 22 and ID control equipment 23, and radio terminals G1 and G2 to make communications with the base station F1, F2 by wireless.

In each radio terminal G1, G2, identification information (unique ID) unique to the radio terminal G1, G2, identification information (system ID) of a system the radio terminal G1, G2 belongs to, identification information (group-ID) of a group the radio terminal G1, G2 belongs to, etc. are set.

The operation control unit 22 or the ID control equipment 23 stores the various identification information (IDs) set in each radio terminal G1, G2 into a memory and manages the various identification information.

Assume that the contents of IDs set in one radio terminal G1 are to be changed. In this event, the radio terminal G1 is moved to the place where the operation control unit 22 is installed, and the radio terminal G1 and the operation control unit 22 are connected through a wire line 24 such as a serial line. Control information is transmitted from the operation control unit 22 to the radio terminal G1 through the wire line 24 so as to change the contents of the set IDs set in the radio terminal G1. New setting or deletion of IDs can be performed in the same manner.

(2) A Second Example Will be Described.

Figure 6:
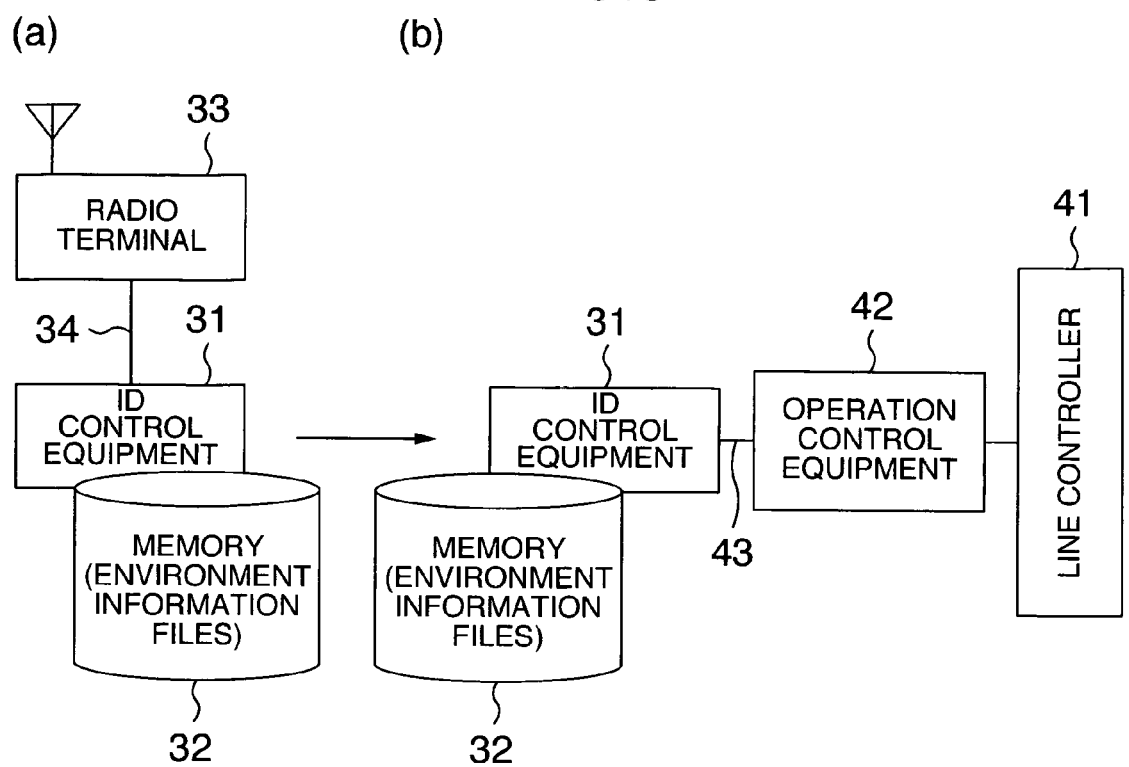
FIG. 6 is a diagram showing an example of a flow of environment information.
Figure 7:
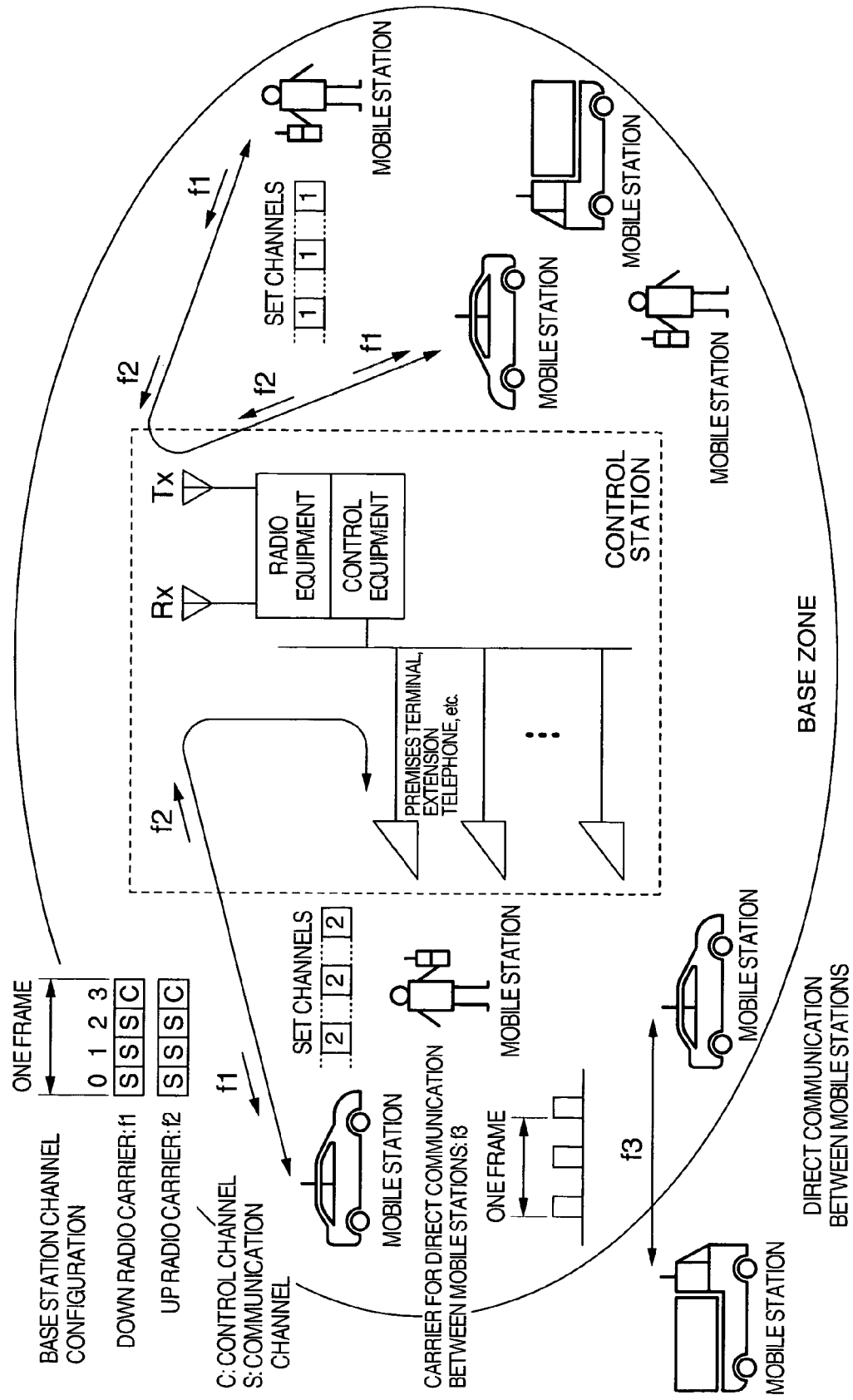
FIG. 7 is a diagram for explaining the concept of a background-art airport radio communication system.
Figure 8:
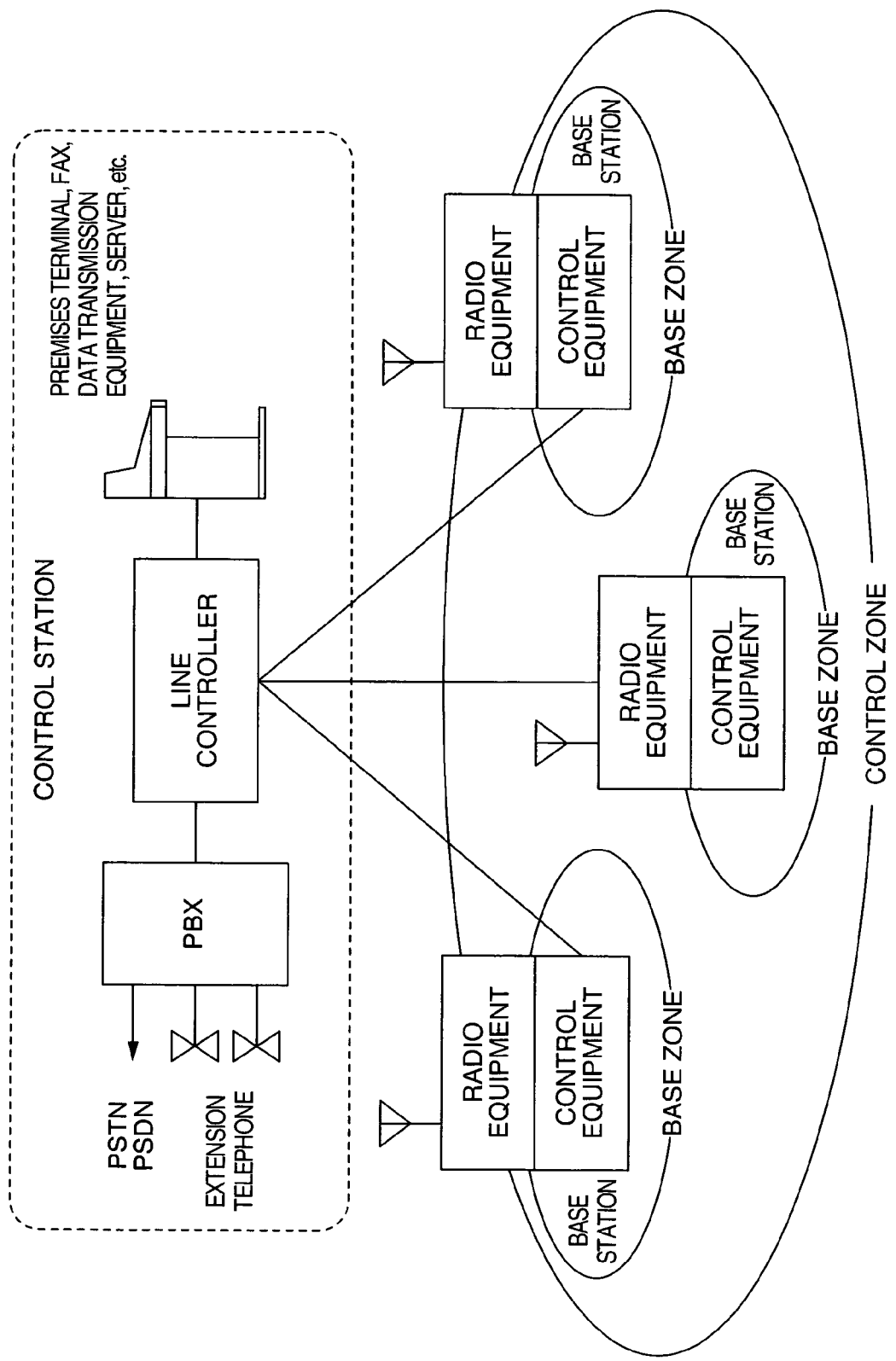
FIG. 8 is a diagram showing an example of a configuration of a background-art base station zone system.

FIGS. 6(A) and (B) show an example of a flow of environment information in an airport MCA radio system.

In this example, ID control equipment 31 has a memory 32 such as a memory for storing files of environment information (environment information files).

As shown in FIG. 6(A), a radio terminal 33 is carried to the place where the ID control equipment 31 is installed or the ID control equipment 31 is carried, and the ID control equipment 31 and the radio terminal 33 are connected through a wire line 34. Environment information is transmitted from the radio terminal 33 to the ID control equipment 31. In the ID control equipment 31, the environment information received from the radio terminal 33 is stored in the memory 32 as a file.

As shown in FIG. 6(B), the ID control equipment 31 is installed or carried, and the ID control equipment 31 is connected to a operation control unit 42 through a wire line 43 such as a serial line. The environment information file acquired from the radio terminal 33 and stored in the memory 32 is reflected in a system (system management side) constituted by the operation control unit 42 and line controller 41.

An embodiment of the present invention will be described with reference to the drawings.

First, an example of a schematic configuration of an airport MAC radio system according to the embodiment or an example of operation thereof will be described.

In the airport MCA radio system according to this embodiment, a center station is constituted by a operation control unit and line controller, and at least one piece of base station is connected to the center station, while a plurality of radio terminals are provided as mobile stations.

In each of the plurality of radio terminals, setting (for example, new setting or changes) of IDs such as an ID unique to the radio terminal, an ID of a group the radio terminal belongs to, etc. is performed by ID control equipment for setting the respective IDs.

In addition, a memory such as a storage table for storing information about IDs set in each radio terminal is provided in either the operation control unit, the line controller or ID control equipment, or two or more of these pieces of equipment.

Such a storage table of the memory stores various environment information of each radio terminal, such as information about IDs, supervisory information, control information, system setting information, communication log information, etc.

Based on desired environment information about a desired radio terminal, the system control equipment, the line controller, the ID control equipment, etc. perform various processing operations such as a supervisory operation, a control operation, a setting operation, a communication operation, a notification operation, etc.

For example, when the group ID set in each radio terminal is changed by the ID control equipment, the group the radio terminal belongs to is changed.

For example, in case of emergency of any radio terminal, reconfiguration is performed on radio terminals belonging to the group the emergency radio terminal belongs to, or radio terminals belongs to other groups that have been set. In this event, the emergency is detected, for example, based on a signal generated from the emergency radio terminal. The contents of group organization in emergency are, for example, set in advance.

In this embodiment, each radio terminal is provided with a memory such as a memory for storing various information such as IDs.

In each radio terminal, identification information (unique ID) unique to the radio terminal, identification information (system ID) for identifying a system the radio terminal belongs to, identification information (group ID) for identifying a group the radio terminal belongs to, etc. are set.

Each ID can be defined by use of information such as a number. Alternatively, each ID can be used as address information or the like by way of example.

Here, in the airport MCA radio system according to this embodiment, a large number of pieces of equipment such as the radio terminals or the base station can be sectioned and distributed to a plurality of systems. By use of identification information (system ID) unique to each system, the system each piece of equipment belongs to is identified or managed.

In the airport MCA radio system according to this embodiment, a large number of radio terminals can be sectioned and distributed to a plurality of groups. By use of identification information (group ID) unique to each group, the group each terminal belongs to is identified or managed. The groups may serve as groups corresponding to services in the airport by way of example.

The configuration of the systems or the groups can be rearranged (changed) dynamically by the operation control unit or the like. In this case, system IDs or group IDs of corresponding pieces of equipment are changed.

In the airport MCA radio system according to this embodiment, environment information about the radio terminals etc. is acquired, stored and managed by the operation control unit, the ID control equipment or the like.

Various information may be used as the environment information. Examples of the information include information about IDs, information about supervision, information about control, information about system setting, information about a communication log, information about maintenance, information about operation, information about states of respective pieces of equipment such as the radio terminals, information about the quality of radio waves such as the received level or the received error ratio in each radio terminal, information about use conditions of wireless channels used for communication, etc.

For example, in accordance with an information notification request issued from the operation control unit, the ID control equipment or the like to a radio terminal or the like, environment information is transmitted from the radio terminal or the like to the operation control unit, the ID control equipment or the like, and acquired by the operation control unit, the ID control equipment or the like. Alternatively, when the ID control equipment or the like is to set environment information such as an ID for a radio terminal, environment information corresponding to the contents to be set is acquired.

Alternatively, environment information may be acquired periodically, or acquired whenever there is a change or the like.

First Embodiment

An airport MCA radio system according to a first embodiment of the present invention will be described.

Figure 1:
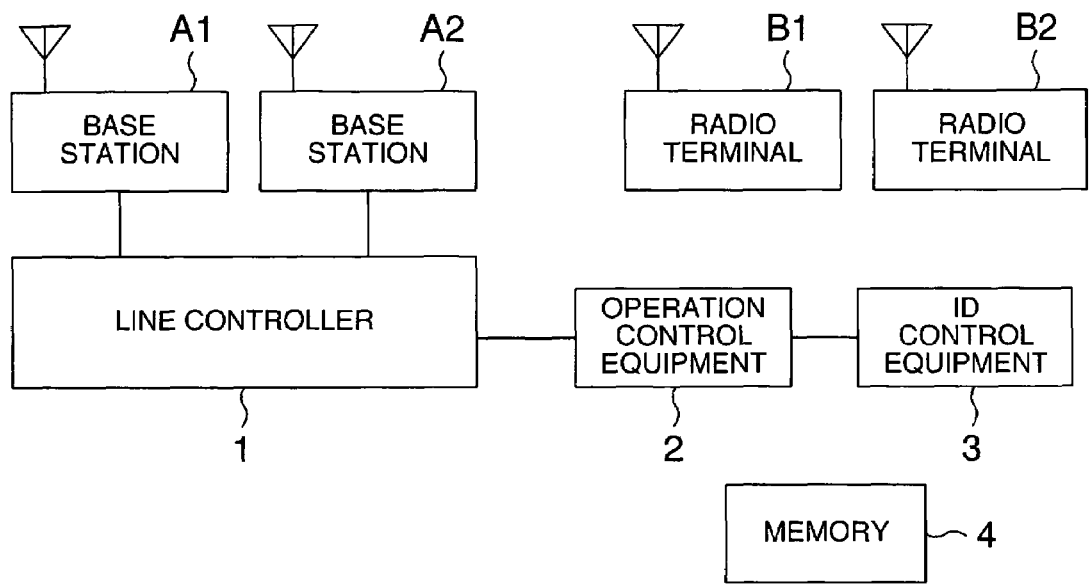
FIG. 1 is a diagram showing an example of a configuration of an airport MCA radio system according to a first embodiment of the present invention.

FIG. 1 shows an example of the configuration of the airport MCA radio system according to this embodiment.

The airport MCA radio system according to the embodiment has line controller 1, a operation control unit 2, ID control equipment 3, a plurality of pieces of base station A1 and A2, and a plurality of radio terminals B1 and B2.

One or both of the operation control unit 2 and the ID control equipment 3 have a memory 4 constituted by a memory for storing environment information. Incidentally, in this embodiment, the memory 4 may be shared, for example, by the operation control unit 2 and the ID control equipment 3.

In this embodiment, a center station is constituted by the line controller 1 and the operation control unit 2 connected, for example, through a wire line. Each base station A1, A2 is connected to the line controller, for example, through a wire line. The ID control equipment 3 is connected to the operation control unit 2, for example, through a wire line.

Each radio terminal B1, B2 has wireless communication with the base station A1, A2 receiving the radio terminal B1, B2. Thus, the radio terminals B1 and B2 can make a call to each other or make data communication with each other through the base station A1, A2.

The operation control unit 2 has functions for managing the airport MCA radio system. For example, the operation control unit 2 has a function of performing supervision/control, a function of performing system setting, a function of accumulating a communication log, etc.

In such a manner, in the airport MCA radio system according to this embodiment, the operation control unit 2, the ID control equipment 3, the radio base station A1 and A2, the radio terminals B1 and B2, wire terminals (not shown), etc. are connected around the line controller 1 by wire or wireless. These pieces of equipment serve for control/management of the airport or general operation in the airport.

In the airport MCA radio system according to this embodiment, information paths used in the system are made good use of as they are, while ID setting (for example, new setting or change) can be performed simply and easily by remote control.

Figure 2:
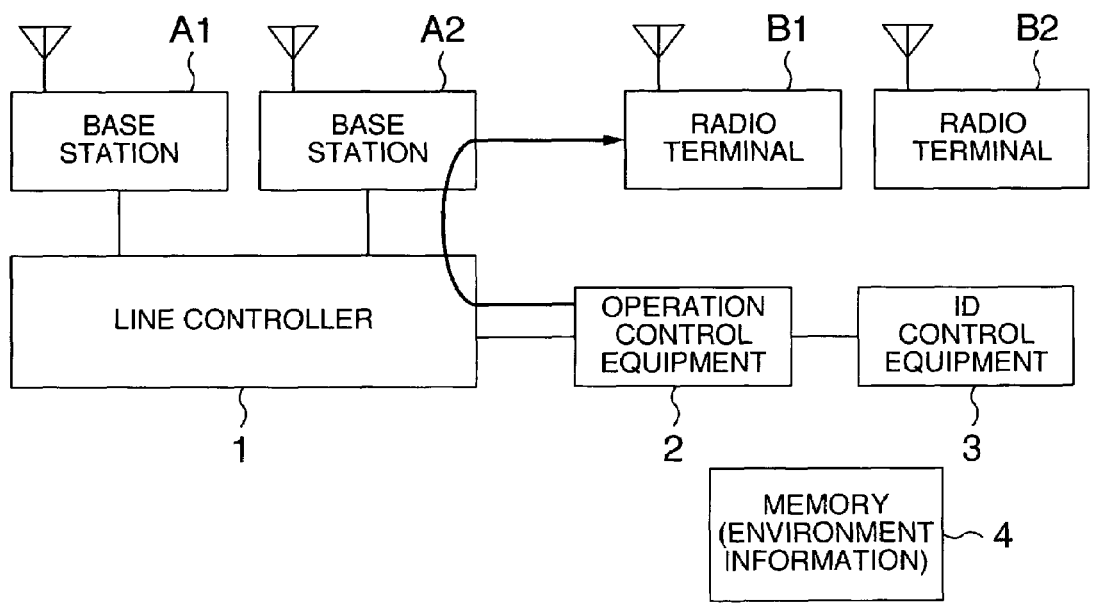
FIG. 2 is a diagram showing an example of remote setting of IDs.

FIG. 2 shows an example of remote setting of IDs in the airport MCA radio system according to the embodiment.

In the embodiment, the operation control unit 2 receiving an instruction from the ID control equipment 3 transmits control information including, for example, a request to change an ID or a changed ID to the radio terminal B1 whose ID is to be changed. This control information is input from the operation control unit 2 to the base station A2 through the line controller 1, and transmitted from the base station A2 by wireless to the radio terminal B1 whose ID is to be changed. The radio terminal B1 receiving the control information changes the ID set in the memory of the radio terminal B1, based on the received control information.

The radio terminal B1 or the line controller 1 transmits reply information to the operation control unit 2 so as to let the operation control unit 2 confirm the change of the ID. The operation control unit 2 transmits this reply information to the ID control equipment 3.

The operation control unit 2 or the ID control equipment 3 changes the memory contents of the memory 4 correspondingly to the contents of such a change of the ID if necessary.

New setting or deletion of IDs can be performed in the same manner.

Examples of the IDs may include unique IDs, system IDs, group IDs, etc.

For example, setting such as new setting or change of IDs is performed in accordance with operation performed on the ID control equipment 3, the operation control unit 2 or the like by a person, or in accordance with an instruction from the radio terminal B1, B2 or the like to the ID control equipment 3, the operation control unit 2 or the like. Alternatively, setting of IDs is performed automatically whenever predetermined conditions are satisfied in the ID control equipment 3, the operation control unit 2 or the like based on conditions set in advance.

Figure 3:
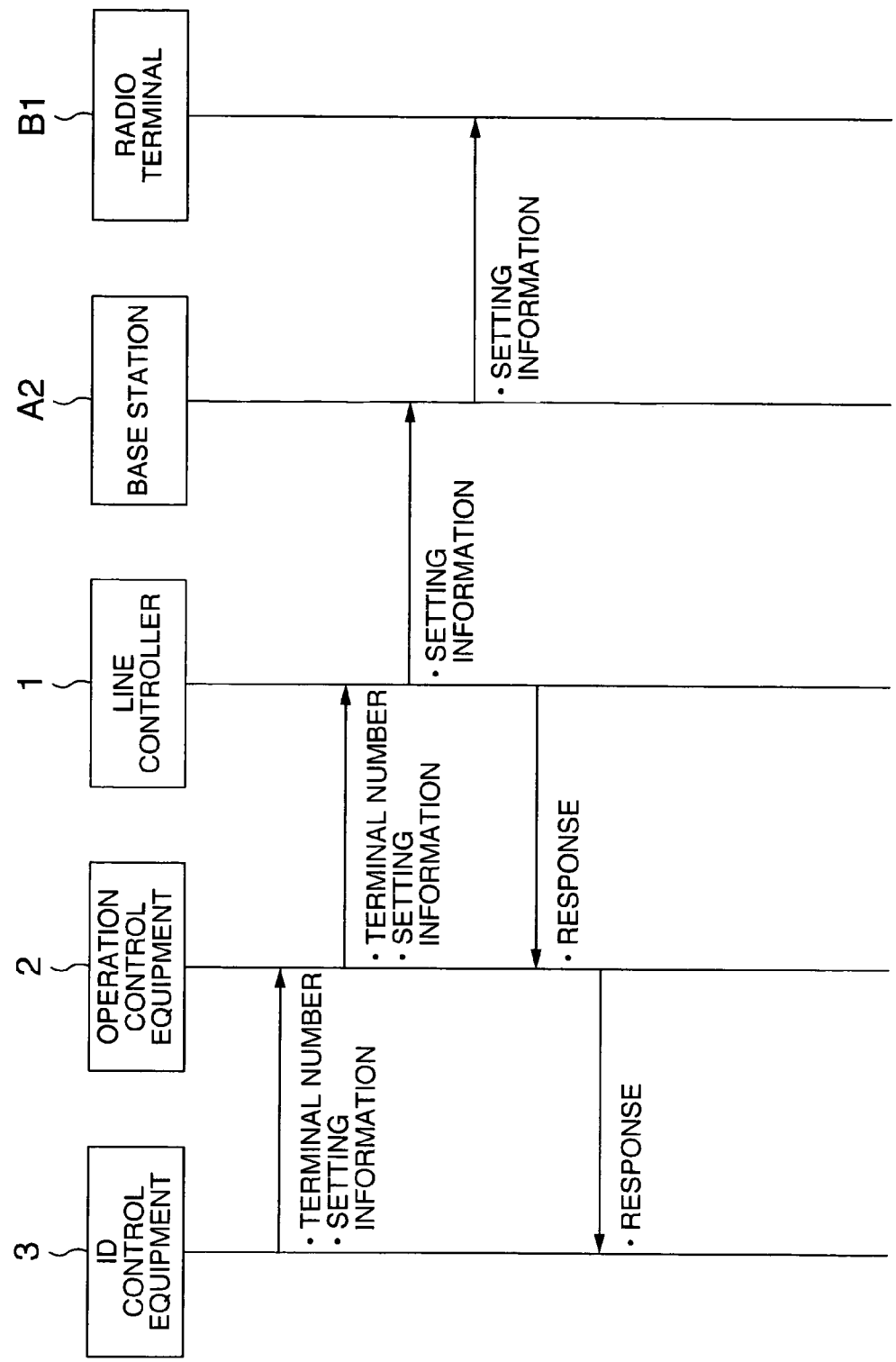
FIG. 3 is a diagram showing an example of a procedure of remote setting of IDs.

An example of the procedure of remote setting of an ID performed in the airport MCA radio system according to the embodiment will be shown with reference to FIG. 3.

First, the ID control equipment 3 transmits the operation control unit 2 information of a terminal number (for example, unique ID) of a radio terminal (radio terminal B1 in this example) whose ID is to be changed, and information of setting contents (for example, setting information of a group ID etc.) concerning the change of the ID.

Next, the operation control unit 2 transmits the line controller 1 the information received from the ID control equipment 3.

Next, the line controller 1 transmits the setting information received from the operation control unit 2, to the radio terminal B1 identified by the terminal number received from the operation control unit 2, via the base station A2.

The line controller 1 sends a response back to the operation control unit 2 about the fact that the transmission has been performed thus.

When receiving the response from the line controller 1, the operation control unit 2 sends a response back to the ID control equipment.

In the airport MCA radio system according to the embodiment, as described above, setting of IDs of the radio terminals B1 and B2 is changed by use of not a wire connection manner but a wireless remote connection manner in a digital radio system constituted by the line controller 1, the operation control unit 2 connected to the line controller 1 so as to perform various operations of the system, the base station A1 and A2, wire terminals (not shown), wireless terminals B1 and B2, and the ID control equipment 3 for registering or changing environment information of the terminals B1 and B2.

Accordingly, in the airport MCA radio system according to the embodiment, IDs of the radio terminals B1 and B2 can be set remotely by wireless. For example, even when each radio terminal B1, B2 is present in any place in the airport area, the ID of the radio terminal B1, B2 can be set surely remotely by wireless. In addition, IDs can be written, for example, in a large number of radio terminals B1 and B2 regardless of the places of the radio terminals B1 and B2. Further, IDs can be set, for example, in accordance with a request from a person (user).

Here, the airport MCA radio system according to the embodiment is, for example, applicable to an airport digital mobile telecommunication system complying with the ARIB standards STD-T87. In this case, a procedure for setting IDs as shown in the embodiment is added to the MCA radio communication procedure (the ARIB standards STD-T87).

Configurations or operations similar to that of the airport MCA radio system according to the embodiment may be applied to various systems such as a municipal community wireless communication system.

Incidentally, in the ID control equipment 3 according to the embodiment, an ID information setting means is constituted by a function of setting information about IDs for the radio terminals B1 and B2. For example, an ID management control information transmitting means is constituted by a function of transmitting control information about setting the information of IDs to the operation control unit 2.

In the operation control unit 2 according to the embodiment, a system management control information receiving means is constituted by a function of receiving control information from the ID control equipment 3, and a system management control information transmitting means is constituted by a function of transmitting control information to the line controller 1.

In the line controller 1 according to the embodiment, a network control control information receiving means is constituted by a function of receiving control information from the operation control unit 2, and a network control control information transmitting means is constituted by a function of transmitting control information to each base station A1, A2.

In each base station A1, A2 according to the embodiment, a base station control information receiving means is constituted by a function of receiving control information from the line controller 1, and a base station control information wireless transmitting means is constituted by a function of transmitting control information to each radio terminal B1, B2 by wireless.

In each radio terminal B1, B2 according to the embodiment, a radio terminal control information wireless receiving means is constituted by a function of receiving control information from each base station A1, A2 by wireless, and an ID information memory setting means is constituted by a function of setting information of IDs in a memory based on the received information.

In at least one of the ID control equipment 3, the operation control unit 2 and the line controller 1 according to the embodiment, an ID information storage means is constituted by a function of storing various information about IDs and the like in a memory (a function of the memory 4 in the embodiment), and an environment information process executing means is constituted by a function of executing various processes based on environment information.

Second Embodiment

An airport MCA radio system according to a second embodiment of the present invention will be described.

Figure 4:
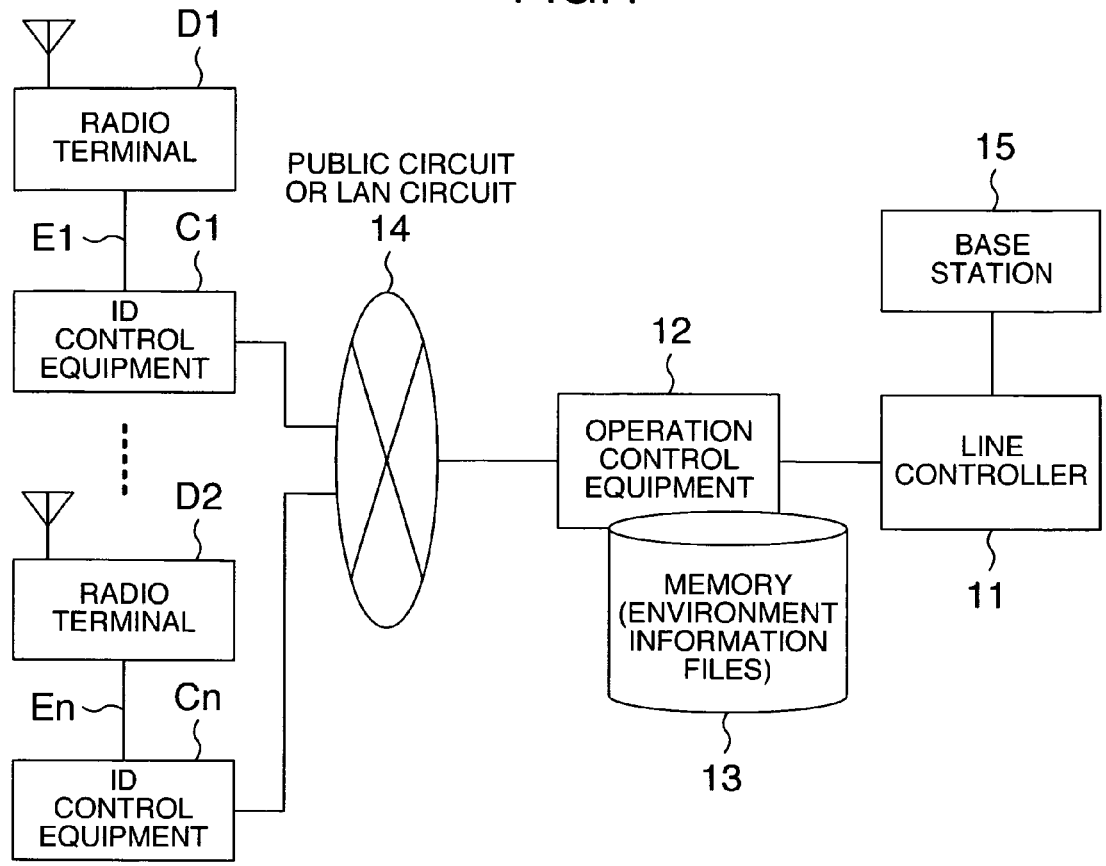
FIG. 4 is a diagram showing an example of a configuration of an airport MCA radio system according to a second embodiment of the present invention.

FIG. 4 shows an example of the configuration of the airport MCA radio system according to this embodiment.

The airport MCA radio system according to the embodiment has line controller 11, a operation control unit 12 having a memory 13 such as a memory for storing files of environment information (environment information files), a network 14 which is, for example, constituted by a public circuit, a LAN (Local Area Network) circuit or the like, base station 15, a plurality of pieces (n pieces in this embodiment) of ID control equipment C1-Cn, and a plurality of radio terminals D1 and D2.

The line controller 11 is connected to the base station 15 and the operation control unit 12, for example, through wire lines. The operation control unit 12 is connected to the network 14, for example, through a wire line. Each ID control equipment C1-Cn is connected to the network 14, for example, through a wire line.

The operation control unit 12 and each ID control equipment C1-Cn are, for example, remote.

Each ID control equipment C1-Cn can be connected to the radio terminal D1, D2 through a wire line E1-En such as a serial line.

In this embodiment, each ID control equipment C1-Cn has a function of communicating (transmitting or receiving) information to the radio terminal D1, D2 connected through the wire line E1-En, so as to register (for example, newly set, change or delete) environment information in each radio terminal D1, D2.

The ID control equipment C1-Cn sends the environment information registered in the radio terminal D1, D2 to the operation control unit 12 through the network 14 in order to deal with the environment information in the system (the system management side in the embodiment).

When receiving the notification of registration of the environment information from the ID control equipment C1-Cn, the operation control unit 12 sends the line controller 11 the environment information of the radio terminal D1, D2 received from the ID control equipment C1-Cn.

The line controller 11 operates the radio terminal D1, D2 in the airport MCA radio system based on the information sent from the operation control unit 12.

The operation control unit 12 performs new registration or update registration of the environment information of each radio terminal D1, D2 sent from the ID control equipment C1-Cn, so as to reflect the environment information on the memory 13.

In addition, in this embodiment, an instruction about registration of environment information can be transmitted from the operation control unit 12 to each ID control equipment C1-Cn through the network 14. Thus, the environment information can be registered in each radio terminal D1, D2 by the ID control equipment C1-Cn in accordance with the contents of the instruction.

In the embodiment, each ID control equipment C1-Cn can issue a request to each connected radio terminal D1, D2 so as to acquire environment information from the radio terminal D1, D2, and transmit the acquired environment information to the operation control unit 12 through the network 14.

Incidentally, setting (for example, new setting, change, deletion or the like) of environment information is, for example, performed in accordance with human operation on each ID control equipment C1-Cn, the operation control unit 12, or the like, or in accordance with an instruction from each radio terminal D1, D2 or the like to each ID control equipment C1-Cn, the operation control unit 12, or the like. Alternatively, setting of environment information is performed automatically whenever predetermined conditions are satisfied in the ID control equipment C1-Cn, the operation control unit 12 or the like based on conditions set in advance.

In the airport MCA radio system according to the embodiment, as described above, environment information registered in each radio terminal D1, D2 is reflected on the operation control unit 12 serving as a manager of the system from each ID control equipment C1-Cn in the following manner in a digital radio system constituted by the line controller 11, the operation control unit 2 connected to the line controller 11 so as to perform various operations of the system, the base station 15, wire terminals (not shown), wireless terminals D1 and D2, and the ID control equipment C1-Cn for performing registration (for example, new setting, change, deletion or the like) of environment information of the terminals D1 and D2. That is, information is transmitted from each ID control equipment C1-Cn to the operation control unit 12 located remotely, through the network 14 which is, for example, constituted by a public circuit or a LAN circuit.

In the airport MCA radio system according to the embodiment, the operation control unit 12 is connected to a plurality of pieces of ID control equipment C1-Cn, so that environment information registered by the ID control equipment C1-Cn can be managed in a lump by the memory 13.

In the airport MCA radio system according to the embodiment, the environment information registered in the memory 13 in the operation control unit 12 can be referred to as shared information or used as setting information by the connected ID control equipment C1-Cn. In such a manner, according to the embodiment, environment information can be centralized and managed while the environment information can be referred to or registered by a plurality of pieces of ID control equipment C1-Cn through a public circuit or a LAN circuit.

Accordingly, in the airport MCA radio system according to the embodiment, environment information about ID management of each radio terminal D1, D2 or each wire terminal can be registered easily in the system (system management side in the embodiment). Reliability of information can be ensured and operation time can be improved.

In addition, in the airport MCA radio system according to the embodiment, environment information about the radio terminal D1, D2 can be reflected in the system (system management side in this embodiment) remotely. For example, it is possible to solve the inconvenience of carrying or installing the ID control equipment.

Here, the airport MCA radio system according to the embodiment is, for example, applicable to an airport digital mobile telecommunication system complying with the ARIB standards STD-T87. In this case, a configuration for making communications with the ID control equipment and the operation control unit using a network as shown in the embodiment is added to the airport digital mobile telecommunication system configuration (the ARIB standards STD-T87).

Configurations or operations similar to those of the airport MCA radio system according to the embodiment may be applied to various systems such as a municipal community wireless communication system.

In each piece of ID control equipment C1-Cn according to the embodiment, a wire connection means is constituted by a function of connecting with each radio terminal D1, D2 through each wire line E1-En, an ID information setting means is constituted by a function of setting information about IDs for the radio terminals D1 and D2, and an information transmitting means is constituted by a function of transmitting information about the radio terminals D1 and D2 to the operation control unit 12 through the network 14.

In the operation control unit 12 according to the embodiment, an information receiving means is constituted by a function of receiving information from the ID control equipment C1-Cn through the network 14, and an information storage means is constituted by a function of storing the received information in the memory 13.

In at least one of the ID control equipment C1-Cn, the operation control unit 12 and the line controller 11 according to the embodiment, an ID information storage means is constituted by a function of storing various information about IDs and the like in a memory (a function of the memory 13 in the embodiment), and an environment information process executing means is constituted by a function of executing various processes based on environment information.

Specific contents of system information in the present invention include a terminal ID, a terminal frequency, a group category, a group priority, a group selection and a group restriction. For example, airport personnel are classified into groups of crews such as flight attendants such as stewardesses, ground crews, transporters, garbage collectors, fire fighters, guards, etc. The center places group selection or restriction on each group so as to make batch communication with each group. Due to the group-by-group communication, a stolen or lost communication terminal can be dealt with by placing a restriction on communication with each group.

The details (functions) of the system according to the present invention as a whole will be described with reference to the following.

(A) Functions of Equipments

1. Line Controller

Function

This equipment is used as line controller of an airport MCA radio system, controlling a wireless line in a call, performing a line connection with a premises wire terminal, a premises radio terminal and a mobile terminal (portable radio terminal, on-vehicle radio terminal) and a line connection between mobile terminals (excluding direct connection between mobile stations), further performing interface control with base station radio equipment, wire terminal connection equipment, a system management terminal, etc.

2. BS: Base Station

Function

This equipment can be mounted with two carriers per wire. This equipment is used together with a control station having functions of voice encoding/decoding, line control and management. This equipment has a redundant configuration.

3. Operation Control Equipment

Function

This terminal is a terminal for setting a system configuration, editing/outputting a communication log, and displaying the state of an equipment fault in an airport digital MCA radio system.

4. ID control equipment

Function

This equipment is equipment for managing IDs of radio terminals and wire terminals and setting ID information about communication for the terminals in an airport digital MCA radio system.

5. Mobile Station

Function

This equipment is a high-function radio terminal provided with a ten-key input portion, and constituted by a radio equipment body, a standard battery pack, a charger, an antenna, etc.

(B) Setting Information Under Remote ID Restriction on Outgoing

Restriction on outgoing can be placed in accordance with a call category in each radio terminal.
GROUP COMMUNICATION (VOICE)
INDIVIDUAL COMMUNICATION (VOICE)
EMERGENCY COMMUNICATION (VOICE)
BROADCAST (VOICE)
GROUP COMMUNICATION (DATA COMMUNICATION)
INDIVIDUAL COMMUNICATION (DATA COMMUNICATION)
EMERGENCY COLUMNIATION (DATA COMMUNICATION)
BROADCAST (DATA COMMUNICATION)
BROADCAST (DATA COMMUNICATION)
SHORT MESSAGE COMMUNICATION In addition, in the ID control equipment, setting such as terminal classification setting, channel setting, abbreviated dialing setting, terminal classification, and assigned group setting (wire terminal ID setting) can be performed. However, such setting is not supported under a current remote ID.

Description will be made below about the entirety of a memory table of environment information or the like in the memory according to the present invention.

In FIG. 9, a plurality of airline companies A, B, C, . . . are received in one airport. For example, the airline companies have company IDs 00-, 01-, 02-, . . . respectively. Pilots, flight attendants, ground crews, clerks, etc. belong to each airline company. For example, a cockpit crew of the airline company A has a portable radio terminal whose ID is 00-111-2345, a flight attendant of the same has a portable radio terminal whose ID is 00-112-XXXX, and a ground crew of the same has a portable radio terminal whose ID is 00-113-XXXX. A cockpit crew of the airline company B has a portable radio terminal whose ID is 01-111-2345, a flight attendant of the same has a portable radio terminal whose ID is 01-112-XXXX, and a ground crew of the same has a portable radio terminal whose ID is 01-113-XXXX. The same thing can be applied to the airline company C. These portable radio terminals belonging to the airline companies A, B and C can be grouped by airline company by use of IDs of the airline companies respectively, or can be grouped by occupational category across the airline companies A, B and C by use of IDs of the occupational categories. The broken line portion in FIG. 9 shows an example of grouping by the occupational category of flight attendants. Such grouping can be set in the portable radio terminals, the base stations or the operation control unit 2, 12, 22 in advance. Alternatively, regrouping can be performed on the management side by the operation control unit 2, 12, 22 in accordance with necessity.

Here, the configuration of the radio communication system according to the present invention or the configuration of each equipment therein is not always limited to the aforementioned one, but various configurations may be used. In addition, for example, the present invention can be provided as a method or a system for executing processes according to the present invention, a program for implementing such a method or such a system, or a recording medium recording such a program. The present invention can be also provided as various apparatus or systems.

The field of applications of the present invention is not always limited to the aforementioned one, but the present invention can be applied to various fields.

Various processes to be executed in the radio communication system according to the present invention or each equipment therein may be, for example, arranged in a configuration of hardware resources including a processor, a memory, etc., in which the processor is controlled by executing a control program stored in a ROM (Read Only Memory). Alternatively, the processes may be arranged as hardware circuits in which, for example, function means for executing the processes are independent of one another.

Further, the present invention can be grasped as a recording medium such as a floppy (registered trademark) disk, a CD (Compact Disk), a ROM or the like, which stores the aforementioned control program and which can be read by a computer, or the present invention can be grasped as the program (itself). Processes according to the present invention can be achieved by inputting the control program from the recording medium to the computer and making a processor execute the program.

The present invention has been described above as an airport radio communication system by way of example. The present invention is not limited to the airport radio communication system, but it can be used broadly as business radio communication systems for the electric power field, the disaster prevention field, etc.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio communication system comprising ID control equipment, a operation control unit, line controller, base station, and radio terminals,
    wherein said ID control equipment includes an ID management control information transmitting means for transmitting terminal control information about setting of information of IDs for said radio terminals, to said operation control unit,
    wherein said operation control unit includes a system management control information receiving means for receiving said control information transmitted from said ID control equipment, and a system management control information transmitting means for transmitting control information based on said received control information to said line controller,
    wherein said line controller includes a network control information receiving means for receiving said control information transmitted from said operation control unit, and a network control information transmitting means for transmitting control information based on said received control information to said base station,
    wherein said base station includes a base station control information receiving means for receiving said control information transmitted from said line controller, and a base station control information wireless transmitting means for transmitting control information based on said received control information to said radio terminals by wireless,
    wherein each of said radio terminals includes a radio terminal control information wireless receiving means for receiving said control information transmitted from said base station by wireless, and an ID information memory setting means for selling information of IDs in a memory based on said received control information; and
    at least one of said ID control equipment, said operation control unit and said line controller includes an ID information storage means for storing said information about IDs set for said radio terminals.

* * * * *